United States Patent
Pihl et al.

(10) Patent No.: US 9,266,511 B2
(45) Date of Patent: Feb. 23, 2016

(54) REGENERATIVE BRAKING SYSTEM FOR A HYBRID ELECTRIC VEHICLE AND A CORRESPONDING METHOD

(75) Inventors: Mattias Pihl, Onsala (SE); Björn Andreasson, Mölndal (SE); Christer Hjelmér, Alingsås (SE)

(73) Assignee: Plug-In Hybrid Vehicle Partnership Handelsbolag, Gothenburg (SE)

( * ) Notice: Subject to any disclaimer, the term of this patent is extended or adjusted under 35 U.S.C. 154(b) by 149 days.

(21) Appl. No.: 13/610,235

(22) Filed: Sep. 11, 2012

(65) Prior Publication Data
US 2013/0076113 A1     Mar. 28, 2013

(30) Foreign Application Priority Data
Sep. 14, 2011    (EP) ................................ 11181240

(51) Int. Cl.
     *B60T 8/58*       (2006.01)
     *B60T 13/58*      (2006.01)
     *B60T 8/1755*     (2006.01)
     (Continued)

(52) U.S. Cl.
    CPC ................. *B60T 13/586* (2013.01); *B60L 7/26* (2013.01); *B60T 8/1755* (2013.01); *B60T 8/1766* (2013.01); *B60T 2220/04* (2013.01);
      (Continued)

(58) Field of Classification Search
    CPC . B60T 13/585; B60T 13/586; B60T 2270/60; B60T 2270/604; B60T 7/10; B60T 7/18; B60T 7/24; B60T 7/26
    USPC .................................................. 303/151, 152
    See application file for complete search history.

(56) References Cited

U.S. PATENT DOCUMENTS 5,632,534 A * 5/1997 Knechtges .................... 303/152
5,895,100 A * 4/1999 Ito et al. ....................... 303/152
(Continued)

FOREIGN PATENT DOCUMENTS

DE          10319663      11/2004
DE    102008017480    10/2008
(Continued)

OTHER PUBLICATIONS

International Search Report and Written Opinion from corresponding EP Application No. EP11181240.0, dated Feb. 16, 2012.

*Primary Examiner* — Thomas J Williams
(74) *Attorney, Agent, or Firm* — Renner, Otto, Boisselle & Sklar, LLP

(57) ABSTRACT

A method and system for controlling regenerative braking of a hybrid electric vehicle. The regenerative braking system includes a driver-operable brake pedal, a hydraulically actuated friction brake for at least one front wheel, an anti-lock braking system hydraulically connected to the hydraulically actuated friction brake, and an electrically actuated friction brake for at least one rear wheel. The regenerative braking system further includes an electric machine connected to the at least one rear wheel and capable of performing regenerative braking of the at least one rear wheel, and an electronic control unit that controls the stability of the hybrid electric vehicle. The regenerative braking system is configured to provide increased braking torque of the front hydraulically actuated friction brake by means of the anti-lock braking system for compensating a decreased or limited rear wheel braking torque initiated by the electronic control unit.

11 Claims, 6 Drawing Sheets

(51) Int. Cl.
 *B60T 8/1766* (2006.01)
 *B60L 7/26* (2006.01)

(52) U.S. Cl.
 CPC ..... *B60T 2270/604* (2013.01); *B60T 2270/608* (2013.01); *B60T 2270/613* (2013.01)

(56) References Cited

U.S. PATENT DOCUMENTS

| | | | |
|---|---|---|---|
| 6,988,779 B2 * | 1/2006 | Amanuma et al. | 303/152 |
| 7,040,721 B2 * | 5/2006 | Weiberle et al. | 303/155 |
| 7,290,840 B2 * | 11/2007 | Tsunehara et al. | 303/3 |
| 8,240,780 B1 * | 8/2012 | Klimes | 303/114.1 |
| 2005/0269875 A1 * | 12/2005 | Maki et al. | 303/152 |
| 2009/0229402 A1 * | 9/2009 | Khan et al. | 74/512 |
| 2009/0256417 A1 * | 10/2009 | Ishii et al. | 303/152 |
| 2010/0113215 A1 * | 5/2010 | Jager et al. | 303/152 |
| 2013/0062930 A1 * | 3/2013 | Muntu et al. | 303/3 |

FOREIGN PATENT DOCUMENTS

| | | |
|---|---|---|
| EP | 2314486 | 4/2011 |
| FR | 2964626 A1 * | 3/2012 |
| WO | 2011073415 | 6/2011 |

* cited by examiner

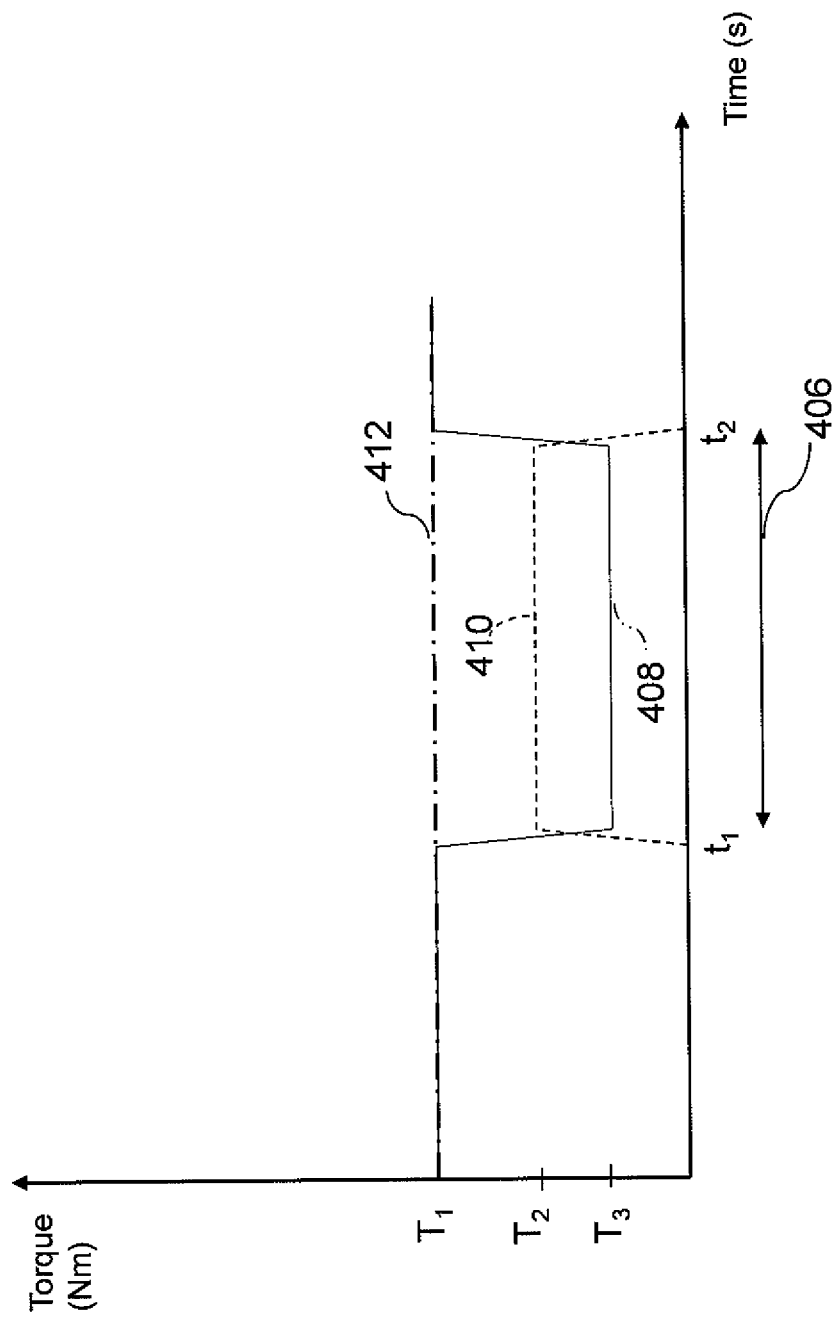

REGENERATIVE BRAKING SYSTEM FOR A HYBRID ELECTRIC VEHICLE AND A CORRESPONDING METHOD

TECHNICAL FIELD

The present invention relates to a system and method for controlling regenerative braking of a hybrid electric vehicle comprising a braking system, which includes a brake pedal suitable for being operated by a driver, a hydraulically actuated friction brake at at least one front wheel, an anti-lock braking system hydraulically connected to said hydraulically actuated friction brake, and an electrically actuated friction brake at at least one rear wheel. The hybrid electric vehicle further comprises an electric machine connected to said at least one rear wheel and capable of performing regenerative braking of said at least one rear wheel.

BACKGROUND ART

In general a hybrid electric vehicle is a vehicle with a combination of a conventional/standard internal combustion propulsion system and an electric propulsion system. A hybrid electric vehicle utilizes the power generated from the internal combustion engine either to charge a battery of the vehicle or to provide driving force to the vehicle or combination of both.

Nowadays, the hybrid vehicle uses advanced technologies which improves the efficiency of the vehicle as well as reduces the emission as compared to conventional internal combustion propulsion system. One such technology is regenerative braking. In regenerative braking, the kinetic energy of the vehicle is converted into electric energy which may be stored in a battery or used to run electrical equipment of the vehicle.

The hybrid electric vehicle, in general, employs a conventional hydraulic brake system along with the advanced regenerative braking technology in order to generate desired braking force for the vehicle. However, such desired braking force is difficult to achieve by means of combined hydraulic and regenerative braking systems, such that the driver may feel unsecure with respect to the functional and capacity of the braking system. There is thus a need for an improved system for controlling regenerative braking in hybrid electric vehicle.

SUMMARY

The object of the present invention is to provide an inventive regenerative braking system for a hybrid electric vehicle where the previously mentioned problems are at least partly avoided. This object is achieved by a system for controlling regenerative braking of a hybrid electric vehicle. The system comprises a braking system having a brake pedal suitable for being operated by a driver, a hydraulically actuated friction brake at at least one front wheel, an anti-lock braking system hydraulically connected to said hydraulically actuated friction brake, and an electrically actuated friction brake at at least one rear wheel. The system further comprises an electric machine connected to said at least one rear wheel and capable of performing regenerative braking of said at least one rear wheel, and an electronic control unit that controls the stability of said hybrid electric vehicle, wherein said electronic control unit is configured to provide increased braking torque of said front hydraulically actuated friction brake by means of said anti-lock braking system for compensating a decreased or limited rear wheel braking torque initiated by said electronic control unit.

Said object is further achieved by a method for controlling regenerative braking of a hybrid electric vehicle. The method comprising the steps of providing said hybrid electric vehicle with a braking system having a brake pedal suitable for being operated by a driver, a hydraulically actuated friction brake at at least one front wheel, an anti-lock braking system hydraulically connected to said hydraulically actuated friction brake, an electrically actuated friction brake at at least one rear wheel, and an electric machine connected to said at least one rear wheel and capable of performing regenerative braking of said at least one rear wheel. The method further comprises the step of providing increased braking torque of said front hydraulically actuated friction brake by means of said anti-lock braking system for compensating a decreased or limited in rear wheel braking torque initiated by said electronic control unit.

In regenerative braking control system, the electronic control unit that controls the stability of said hybrid electric vehicle may decide to limit or decrease the regenerative braking torque in response to a traffic and driving situation where an elevated risk of vehicle instability is determined by said electronic control unit. This function is provided because the regenerative braking torque is only provided by the rear wheels, which therefore may be over-braked compared with the front wheel brakes. 100% rear wheel brake distribution is allowed during certain situations where the risk of rear wheel skid is estimated relatively low, such as during braking with low braking torque, without excessive vehicle cornering, and with road conditions providing relatively high level of friction between wheels and road surface. Many other factors may be taken into account when determining the risk of rear wheel skid.

Consequently, if an elevated risk of vehicle instability is determined, the electronic control unit may decide to limit or decrease the regenerative braking torque, such that the driver may experience a loss of braking force without having released the brake pedal, or at least a loss of braking force that is unproportional to the brake pedal motion. The change in vehicle brake torque might thus be independent from a corresponding change in brake pedal motion. The loss of vehicle braking torque results in driver discomfort and insecureness as to the reliability and proper function of the vehicle brake system. The invention solves this problem by providing a regenerative braking system that is configured to automatically compensate a decreased or limited rear wheel braking torque that is initiated by said electronic control unit for stability reasons. The automatic compensation involves providing increased braking torque of said front hydraulically actuated friction brake for compensating a decreased or limited rear wheel braking torque. The increased level of front wheel hydraulic braking torque preferably completely corresponds to the decreased or limited level of rear wheel regenerative braking torque. The increased level of front wheel hydraulic braking torque is provided by means of the standard vehicle anti-lock braking system because then no additional electro-hydraulic equipment is necessary, resulting in a more economical solution.

Preferably, the rear wheel braking torque is provided by the electric machine and/or the electrically actuated friction brake.

The rear electrical friction brakes are provided as a complement to the electrical machine, and provides the desired rear wheel braking torque to an extent not providable by the electrical machine, due to for example low vehicle speed, high desired braking torque, limited regenerative braking torque capacity, fully charged electrical storage unit, etc. The decreased or limited rear wheel braking torque may thus be established by the electrical machine and/or the electrical rear wheel friction brakes.

It is also preferred that the electric machine is an AC or DC electrical motor and the same is rotationally connected to the at least one rear wheels.

In one of the advantageous aspect of the invention said at least one rear wheel is free from hydraulically actuated friction brakes. This enables a more economical product solution where an expensive and service demanding rear wheel hydraulic braking system can be completely avoided. This solution also enables providing the brake system with an advantageous initial brake pedal motion gap, as described in more detail below.

Said at least one front wheel is mechanically disconnected from the electrical machine, such that the electrical machine only can provide regenerative braking torque by means of the at least one rear wheel. By avoiding any rotational couplings between the front wheels and the electrical machine, further cost savings are provided. This also enables a more functionality oriented localisation of the electrical machine and electrical storage unit, such as a battery, close to the rear wheels, for the purpose of further reducing manufacturing costs and weight of the vehicle.

According to an advantageous aspect of the invention the brake pedal is provided with an initial brake pedal motion gap, in which the motion of the brake pedal is independent from the motion of at least one piston of a master brake cylinder of the hydraulic braking system, such that no vehicle braking torque is applied by the hydraulically actuated friction brake of said at least one front wheel upon actuation of the brake pedal within said initial brake pedal motion gap. This arrangement solves the combined hydraulic and regenerative braking in an efficient and cost effective manner. During the initial brake pedal motion from a rest position, the brake pedal is within said initial brake pedal motion gap. Within this gap, motion of the brake pedal does not result in any front wheel hydraulic brake torque. Instead, the brake pedal depression level is sensed by means of a sensor, such as an angle sensor. Sensor data about brake pedal depression is transmitted to an electronic control unit that subsequently controls the electrical machine and rear electrical to provide a brake torque substantially corresponding to desired brake torque from the vehicle driver. Vehicle driver desired brake torque within the initial brake pedal motion gap may be determined using a predetermined brake torque function that uses brake pedal depression level as input.

According to an advantageous aspect of the invention, the initial brake pedal motion gap lies within the range of 3%-50% of the total available brake pedal motion, preferably 5%-40% of the total available brake pedal motion, and more preferably 7%-40% of the total available brake pedal motion.

According to an advantageous aspect of the invention the anti-lock braking system comprises a hydraulic pump unit. The hydraulic pump unit may used to provide the increased hydraulic pressure in the hydraulic brake system that is required to increase the braking torque of the front hydraulically actuated friction brake. Use of the already existing hydraulic pump of the standard ABS-unit for increasing the hydraulic pressure of the front wheel friction brakes provides a cost efficient solution.

In yet another advantageous aspect of the invention the decrease in regenerative braking torque initiated by the electronic control unit is a response to a determined over-braked condition of the at least one rear wheel. Over-braked rear wheels result when too high brake torque is applied to rear brakes compared with applied front brake torque.

Further, said over-braked condition is determined based on factors such as increased vehicle yaw rate, road temperature sensor data, outside air temperature data, rain sensor data, increased rear wheel slip, road inclination data, vehicle roll rate, and suspension displacement data.

In another advantageous aspect of the invention the braking system comprises a hydraulic master cylinder assembly having at least one piston arranged to be actuated by said brake pedal, a caliper assembly and corresponding brake disc at said at least one front wheel, and hydraulic lines, wherein said hydraulic line fluidly interconnects said hydraulic master cylinder assembly with said anti-lock braking system, and said caliper assembly of said at least one front wheel with said anti-lock braking system, and wherein said anti-lock braking system, during at least one mode thereof, is configured to pass on hydraulic pressure from said hydraulic master cylinder assembly to said caliper assembly.

By means of providing an almost standard hydraulic brake system to the front wheels, no additional expensive and complex electro-mechanical brake torque distribution devices are necessary to provide an efficient combined hydraulic and regenerative braking system. Merely an initial brake pedal motion gap with belonging sensor is required to achieve an fully operational regenerative braking system. Hence, a cost-effective and reliable regenerative braking system is provided.

BRIEF DESCRIPTION OF THE DRAWINGS

The present invention will now be described in detail with reference to the figures, wherein:

FIG. 4b shows a graph illustrating an exemplary regenerative braking torque sequence for controlling regenerative braking of a hybrid electric vehicle in accordance with the present invention with constant brake pedal position and a period of increased risk of rear wheel skid.

DETAILED DESCRIPTION

Various aspects of the invention will hereinafter be described in conjunction with the appended drawings provided to illustrate and not to limit the invention, wherein like designations denote like elements, and variations of the aspects are not restricted to the specific shown aspect, but are applicable on other variations of the invention.

Figure 1:
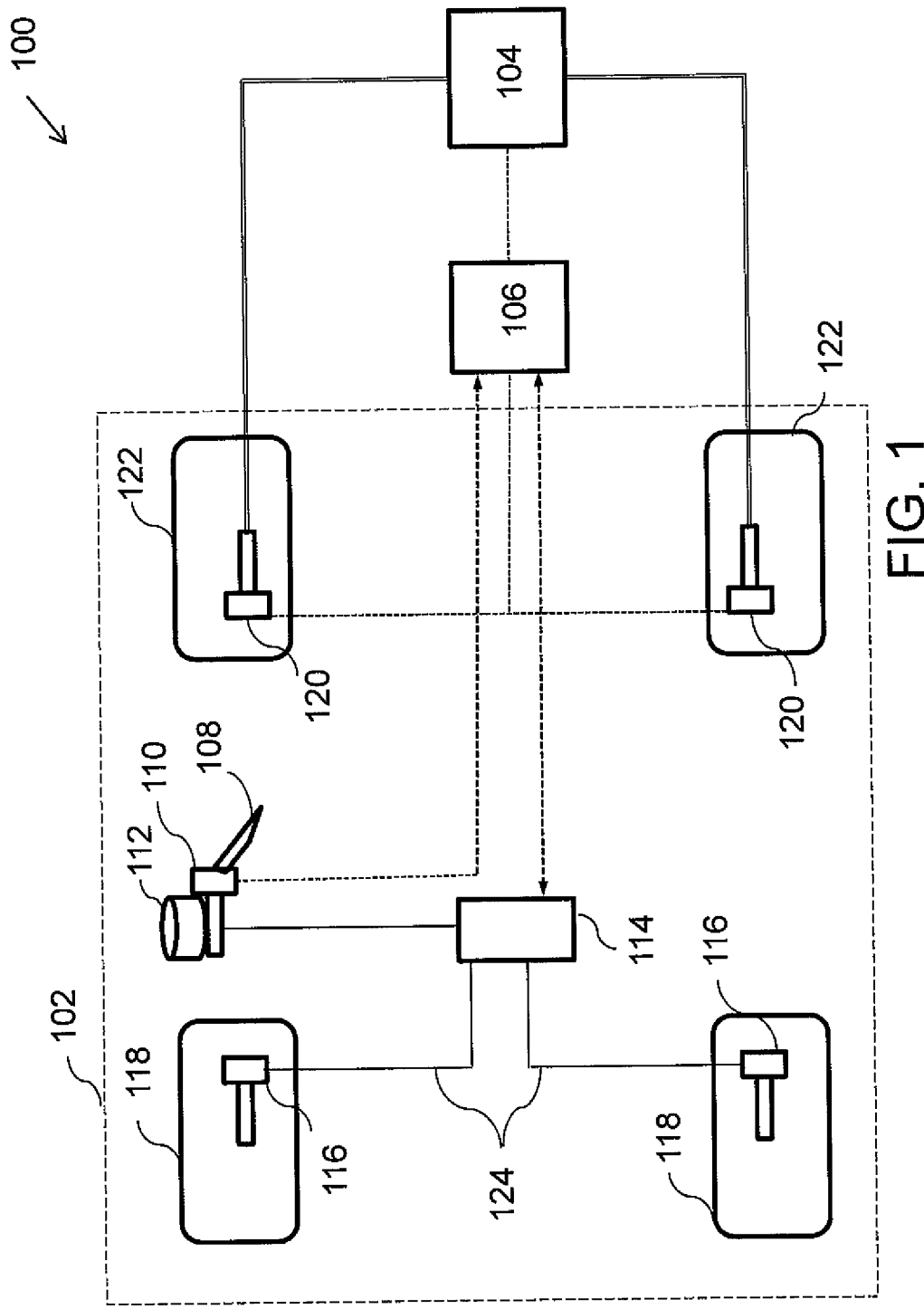
FIG. 1 illustrates a schematic a regenerative braking system for a hybrid electric vehicle in accordance with the present invention.

FIG. 1 illustrates a schematic diagram of a regenerative braking system 100 for a hybrid electric vehicle according to the present invention. The regenerative braking system 100 as shown in FIG. 1 comprises a braking system 102, an electric machine 104 and an electronic control unit (ECU) 106.

The braking system 102 comprises a brake pedal 108, a hydraulic master cylinder assembly 110, a reservoir for hydraulic fluid 112, an anti-lock braking system 114, hydraulically actuated friction brakes 116 at front wheels 118 of the vehicle and electrically actuated friction brakes 120 at rear wheels 122 of the vehicle, which typically is an automobile.

The brake pedal 108 may be of any type of available pedals which enables a driver to operate the brakes suitably. The brake pedal 108 actuates the hydraulically actuated friction brakes 116 in a conventional manner. In addition however, the brake pedal 108 is designed to have an initial brake pedal motion gap. Within this gap, the brake pedal 108 has a free pedal movement independent from the motion of the piston or pistons of the hydraulic master cylinder assembly 110. This motion gap is provided at the beginning of the pedal motion path, i.e. beginning at the natural, relaxed state of the pedal path, and ending a certain distance from said beginning. During initial depression of the brake pedal 108, the brake pedal 108 is arranged within said motion gap and it does not actuate the hydraulically actuated friction brakes 116. Instead, during normal circumstances, the initial brake pedal motion gap is arranged to provide only regenerative braking torque and/or braking torque by means of the electrically actuated friction brake 120.

The hydraulic master cylinder assembly 110 comprises at least one piston for increasing the hydraulic pressure in the hydraulic brake lines 124. The master cylinder assembly 110 is configured to build hydraulic pressure on actuation of the brake pedal 108. The hydraulic pressure in turn actuates caliper assemblies 116 of the front wheels 118 to apply brake torque to the front wheels 118. Further, the hydraulic master cylinder 110 assembly actuates the caliper assembly 116 through a conventional anti-lock braking system 114.

The anti-lock braking system 114 normally simply passes on the hydraulic pressure from the hydraulic master cylinder assembly 110 to the caliper assemblies 116 via a valve assembly. Only during operation of the anti-lock braking system 114 is the fluid path between the hydraulic master cylinder assembly 110 and the caliper assemblies 116 periodically interrupted for the purpose of reducing the hydraulic pressure in the brake lines 124 leading to the front wheels 118, thus preventing the front wheels 118 from locking up and therefore avoiding skidding. The anti-lock braking system 114 further comprises an integral hydraulic pump unit that provides the required increase of hydraulic pressure so the braking force is reapplied, thus slowing down the front wheel 118. The integral hydraulic pump of the anti-lock braking system 114 may draw hydraulic fluid from the reservoir 112 when an increase of braking pressure is demanded.

The regenerative braking system 100 further comprises an electric machine 104 that is connected and controlled by the electronic control unit 106. The electric machine 104 is further rotationally coupled to at least one, preferably both of the rear wheels 122, as shown in FIG. 1. The rotational coupling may include a clutch to facilitate disconnection of the electric machine 104 during periods of disoperation. The electric machine 104 is designed to provide regenerative braking of the rear wheels 122 upon receiving control signals from the electronic control unit 106. In other words, the electric machine 104 acts a regenerative braking mechanism where the kinetic energy of the vehicle is utilized to charge a non-showed battery or the like, or used to drive other electric equipment of the vehicle, thereby slowing down the vehicle. The complete system is controlled by ECU 106. The ECU 106 may be a single ECU or several separate interconnected ECUs that jointly provide the desired vehicle control. For example, one ECU may control braking and stability of the vehicle, whereas a separate ECU operates the anti-lock braking system 114. There may alternatively be separate ECU controlling the operation of the electrical machine, and there might be a separate control unit at each rear wheel 122 in control of the electrically actuated friction brakes 120.

According to the schematic view of FIG. 1, the ECU 106 is connected to the anti-lock braking system 114 and to the electrically actuated friction brakes 120 of the rear wheels 122. Moreover, the ECU 106 is arranged to receive input signals from a brake pedal angle sensor arranged at the brake pedal 108. The ECU 106 here controls stability of the vehicle while being in communication with the anti-lock braking system 114. Rear wheel braking torque is provided by the electric machine 104 and/or the electrically actuated friction brake 120 at at least one of the rear wheels 122.

The purpose of the invention is to avoid any inconsistency between brake pedal position and vehicle deceleration. Such inconsistency may occur if the ECU 106 controls the electrical machine 104 to reduce regenerative braking torque for stability reasons, independent from motion of the brake pedal 108. The solution to this problem is to configure the regenerative braking system 100 to provide increased braking torque of the front hydraulically actuated friction brakes 116 by means of the anti-lock braking system 114 for compensating such a decreased or limited regenerative rear wheel braking torque.

Figure 2:
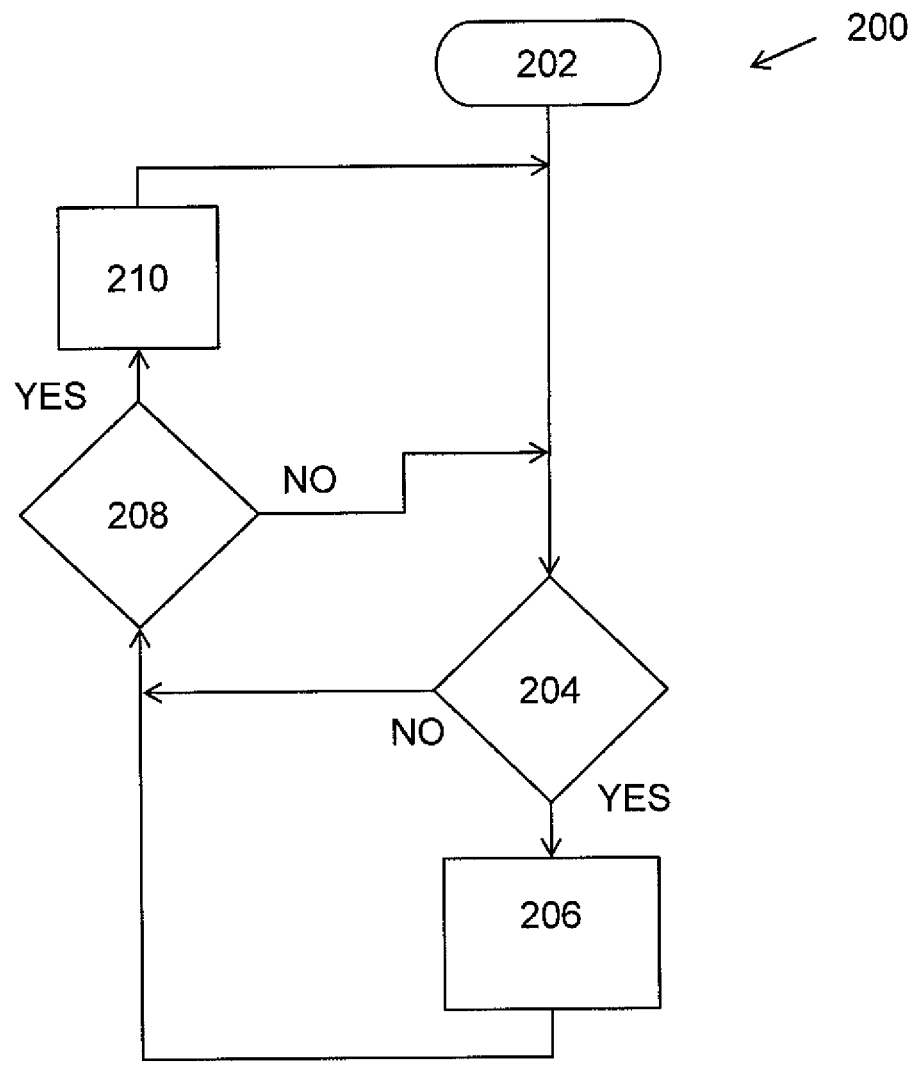
FIG. 2 shows a flow chart describing a process of controlling regenerative braking of a hybrid electric vehicle in accordance with the present invention.

FIG. 2 shows a flow chart describing a process for controlling regenerative braking of a hybrid electric vehicle in accordance with a preferred aspect of the present invention. The method initiates at step 202. At step 204, it is investigated if the rear wheels 122 are over-braked or not in terms of acceptable vehicle stability. Acceptable vehicle stability may be defined by current front-rear brake balance, and factors such as vehicle yaw rate, road temperature sensor data, outside air temperature data, rain sensor data, increased rear wheel slip, road inclination data, vehicle roll rate and suspension displacement data, etc.

Should it be determined that the rear wheels 122 are indeed over-braked, the rear wheel braking torque is decreased or at least limited, i.e. prevented from increasing further. By this measure, which is denoted step 206, rear wheel skidding and/or general low stability level is avoided. If no decrease or limitation would have been performed at this stage, vehicle instability, and in worst case total loss of vehicle stability might have been the result. For the purpose of compensating any undesired loss of vehicle braking torque, or simply avoiding any inconsistency between brake pedal position and total vehicle braking torque, the anti-lock braking system 114 is used to increase the braking torque of the front hydraulically actuated friction brake 116. In other words, when the rear wheel regenerative braking is reduced or limited, the loss in braking torque is automatically compensated by increased braking torque of the front hydraulically actuated friction brakes 116. The ECU 106 controls the hydraulic pump of the anti-lock braking system 114 for increasing the braking torque of the front friction brakes 116.

In case it is determined in step 206 that rear wheels 12 are not over-braked, the method will go to step 208 for determining if the rear wheel braking torque may be at least partly restored in terms of acceptable vehicle stability. This step is important in a scenario where for example the vehicle yaw rate decreases, because reduced vehicle yaw rate means increased vehicle stability, in particular in combination with rear wheel braking. Should the answer to this question be yes, the ECU will in a method step denoted 210 begin to at least partly restore rear wheel braking torque, preferably by regenerative braking.

Figure 3:
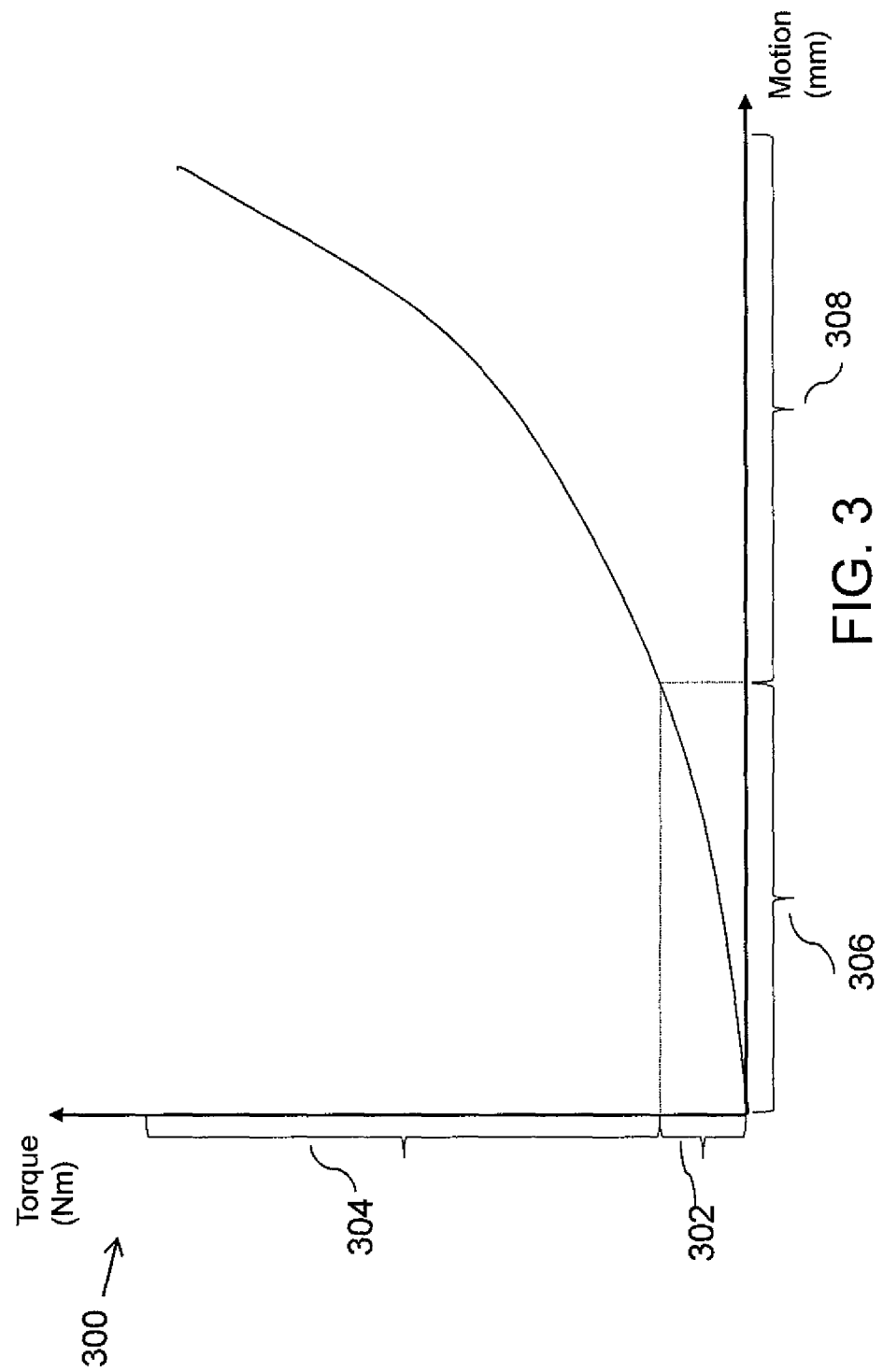
FIG. 3 shows a braking characteristic graph illustrating exemplary braking characteristic during driving without risk of rear wheel skid.

FIG. 3 shows a graph illustrating a typical braking characteristic of a hybrid electric vehicle during driving without risk of rear wheel skid, wherein resulting brake torque on the vertical axis is plotted as a function of brake pedal motion on the horizontal axis. During an initial brake pedal motion gap 306, hydraulically actuated friction brakes 116 at front wheels 118 are not activated and the braking torque is performed by the electric machine 104 connected to the rear wheels 122 i.e. regenerative braking and/or by the electrically actuated friction brakes 120 at the rear wheels 122. The distribution between these two rear wheel brake torque sources is determined based on regenerative brake torque capacity, load level of battery, etc.

Within the initial brake pedal motion gap 306 the brake pedal 108 may move a distance without interacting with the pistons of the master brake cylinder 110 of the brake system 102. Therefore, no increased hydraulic pressure in brake lines 124 is provided. In this stage, brake torque is entirely dependent on a brake pedal position sensor, or the like, that determines level of depression, which is used by the electronic control unit 106 to determine desired brake torque. The available brake torque range within the initial brake pedal motion gap 306 is in FIG. 3 denoted 302.

Once the driver depresses the brake pedal 108 with a larger force, it will eventually move across and past the initial brake pedal motion gap 306 into a hydraulic zone 308, where also the hydraulically actuated front brakes 116 are actuated. Hence, an additional braking torque is provided by applying the hydraulically actuated friction brakes 116 at the front wheels 118. This function is achieved by for example providing a physical gap between the brake pedal 108 in its natural position and the pistons of the master brake cylinder 110. Once the brake pedal 108 crosses the initial brake pedal motion gap 306, the brake pedal 108 comes into contact with at least one piston of the master brake cylinder 110, leading to increased hydraulic pressure in the brake lines 124, and consequently increased brake torque. The ECU 106 calculates desired brake torque of electrically actuated rear friction brakes 120 dependent on estimated desired braking torque by driver, present regenerative braking torque, applied front brake torque and target front-rear brake distribution in view of acceptable vehicle stability.

To develop an understanding, consider the following scenario: The brake pedal motion may be divided in two stages, namely the initial brake pedal motion gap 306 and the hydraulic zone 308. Within the initial brake pedal motion gap 306 the brake pedal 108 may move a certain distance without actually conveying motion to the pistons of the master brake cylinder 110. Therefore, at initial brake pedal motion gap 306 no increased pressure is communicated to the hydraulically actuated friction brakes 116 of the front wheels 118. However, a brake pedal sensor provides information to the electronic control unit 106 regarding the estimated desired brake torque. Upon receiving such information the electronic unit 106 actuates the electric machine 104 connected to the at least one rear wheel 122 and/or the electrically actuated friction brake 120 at least one rear wheel 122 in order to generate brake torque corresponding to the brake pedal position.

The initial brake pedal motion gap 306 lies within the range of 3%-50% of the total available brake pedal motion, preferably within 5%-40% of the total available brake pedal motion, and more preferably within 7%-40% of the total available brake pedal motion.

The hydraulic zone 308 starts when the driver depresses the brake pedal 108 further and the brake pedal 108 leaves the initial brake pedal motion gap 306, as explained above. In this zone, the brake pedal 108 communicates the increased pressure directly to the pistons of the master brake cylinder 110, which pistons increase the hydraulic pressure in the brake lines 124 in order to actuate the hydraulically actuated friction brakes 116 of the front wheels 118, in addition to the regenerative braking and/or electrically actuated friction brake 120 of the rear wheels 122. In this case, the ECU 106 controls the brake torque balance by controlling level of regenerative braking and brake torque of the electrically actuated friction brakes 120.

Figure 4A:
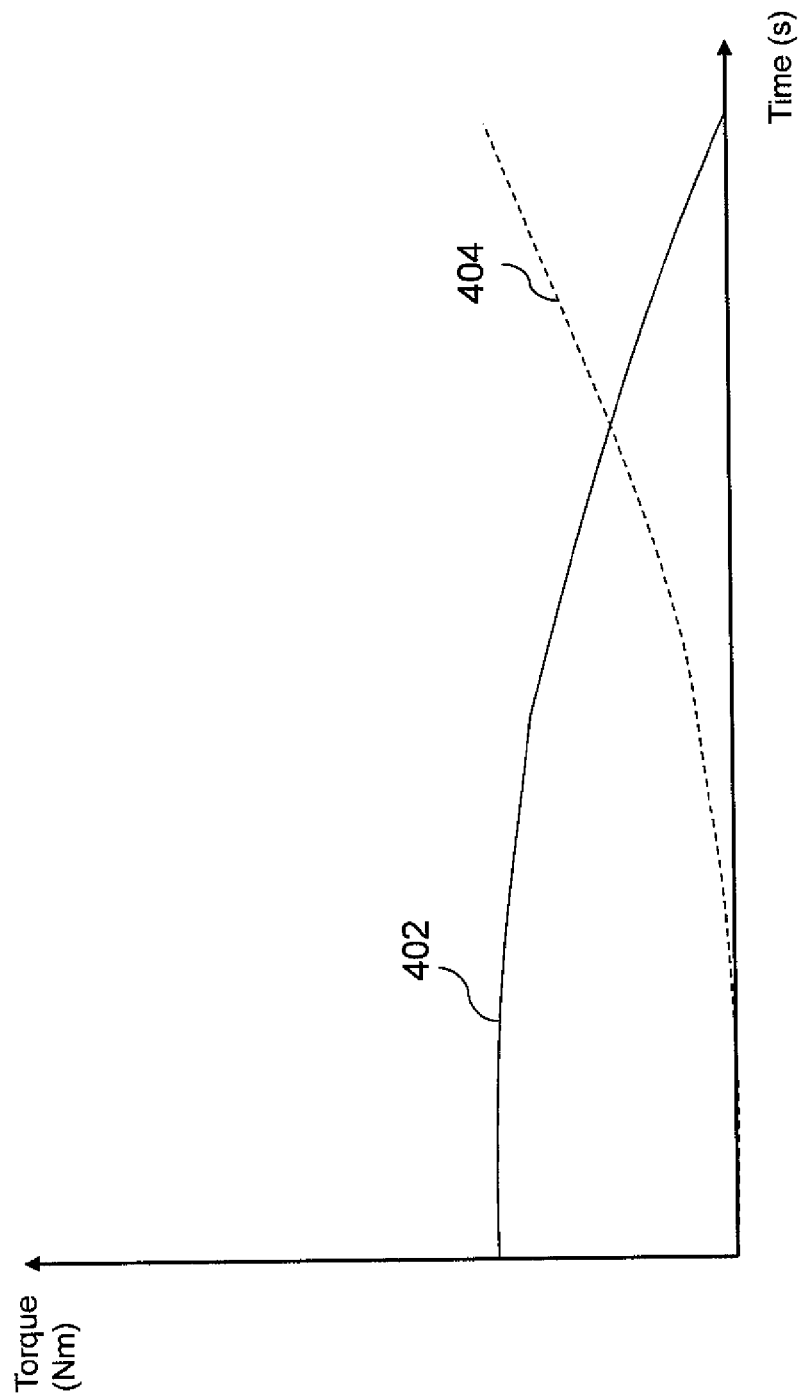
FIG. 4a shows a graph illustrating an exemplary regenerative braking torque sequence of the electrical machine and the electrically actuated friction brakes in accordance with the present invention with constant brake pedal position and with low risk of rear wheel skid.

FIG. 4a shows a graph illustrating the interaction of rear wheel regenerative braking and rear wheel electrically actuated friction braking during a braking sequence with constant brake pedal position within the initial brake pedal motion gap, and with low risk of rear wheel skid, wherein resulting braking torque on the vertical axis is plotted as a function of time on the horizontal axis. During the constant brake pedal position deceleration is mainly performed by the rear wheels 122 by means of the electric machine 104 that is connected to the rear wheels 122, and/or electrically actuated friction brakes 120 of the rear wheels 122. Front hydraulically friction brakes 116 are not applied. A certain brake torque level may however by provided by engine braking torque.

In the graph it is shown that the level of regenerative braking 402 is reduced due to reduced speed of the vehicle. To provide constant braking torque corresponding to the constant brake pedal position, the brake torque level 404 of the electrically actuated friction brakes 120 increases correspondingly for compensating the loss of regenerative braking torque, such that total braking torque of the vehicle is kept constant.

FIG. 4b illustrates the interaction of regenerative and non-regenerative rear wheel braking and compensating front wheel braking during a braking sequence with constant brake pedal position within the initial brake pedal motion gap, wherein the sequence comprises an intermediate period 406 of increased risk of rear wheel skid. The regenerative braking system 100 is configured to provide increased braking torque of said front hydraulically actuated friction brake 116 by means of said anti-lock braking system 114 for compensating a decreased rear wheel braking torque initiated by said electronic control unit 106. The resulting braking torque on the vertical axis is plotted as a function of time on the horizontal axis. In the graph, line 408 denotes total rear wheel braking torque, provided by the regenerative braking torque by the electric machine 104 and/or electrically actuated friction brakes 120. Line 410 denotes hydraulically actuated front wheel brake torque, and line 412 denotes accumulated brake torque from electric machine 104, electrically actuated rear friction brakes 120, and hydraulically actuated front friction brakes 116.

Prior to the period 406 of increased risk, braking torque at level $T_1$ is provided by regenerative braking torque by the electric machine 104 and/or electrically actuated friction brakes 120 only. The hydraulically actuated front friction brakes 116 are not applied. At time $t_1$, a period of increased risk of vehicle instability begins, for example due to relatively high yaw rate during vehicle cornering. The ECU commands decreased rear wheel braking torque to level $T_3$ to prevent any rear wheel skid that may lead to complete loss of vehicle stability. Simultaneously, the hydraulically actuated friction brakes 116 at the front wheels 118 are pressurized by the hydraulic pump of the anti-lock braking system 114 in order to compensate for the decrease in rear wheel braking torque.

Here, the front hydraulically actuated friction brakes 116 provides a braking torque level $T_2$, which is substantially equal to the decreased braking torque of the rear wheels 122, i.e. $T_1$-$T_3$. The combined braking torque of the front and rear wheels 118, 122 therefore does not change, no driver discomfort arises, and vehicle remains stable. Finally, at time $t_2$, the period of increased risk of vehicle instability ends, for example due to reduced vehicle yaw rate, rear wheel braking torque is restored to normal level $T_1$, and the compensating front brake torque is ceased. The combined braking torque of the front and rear wheels 118, 122 does therefore not change here either.

A brake torque distribution is preferably continuously measured in order to determine the vehicle front/rear brake balance i.e. distribution of brake torque between front and rear wheels 118, 122. This distribution is constantly updated at a high frequency, and used to determine if rear wheels 122 are being deemed over-braked, which might lead to vehicle instability. To determine if rear wheels 122 are deemed over-braked, factors such as vehicle yaw rate, road temperature sensor data, outside air temperature data, rain sensor data, increased rear wheel slip, road inclination data, vehicle roll rate, suspension displacement data, are taken into account. Furthermore, not only factors influencing vehicle stability is taken into account, but also level of regenerating braking torque, leading to improved efficiency of the hybrid electric vehicle. The desired brake torque distribution is thus a balance between at least, often contradictory, vehicle stability factors and vehicle efficiency factors, where as much energy as possible is regenerated during braking but with a relatively low risk of vehicle stability problems, such as wheel skid.

Based on determined desired brake torque distribution, the level of decreased rear wheel braking torque is calculated, which decrease is independent from motion of the brake pedal 108. The decrease is thus a result of a newly determined desired brake torque distribution, which within the brake pedal motion gap only can be achieved using the hydraulic pump of the anti-lock braking unit 114.

The increase in front wheel braking torque by means of the anti-lock braking system 114 substantially corresponds to decrease in rear wheel braking torque, such that substantially no variation in vehicle total braking torque can be determined.

Figure 5:
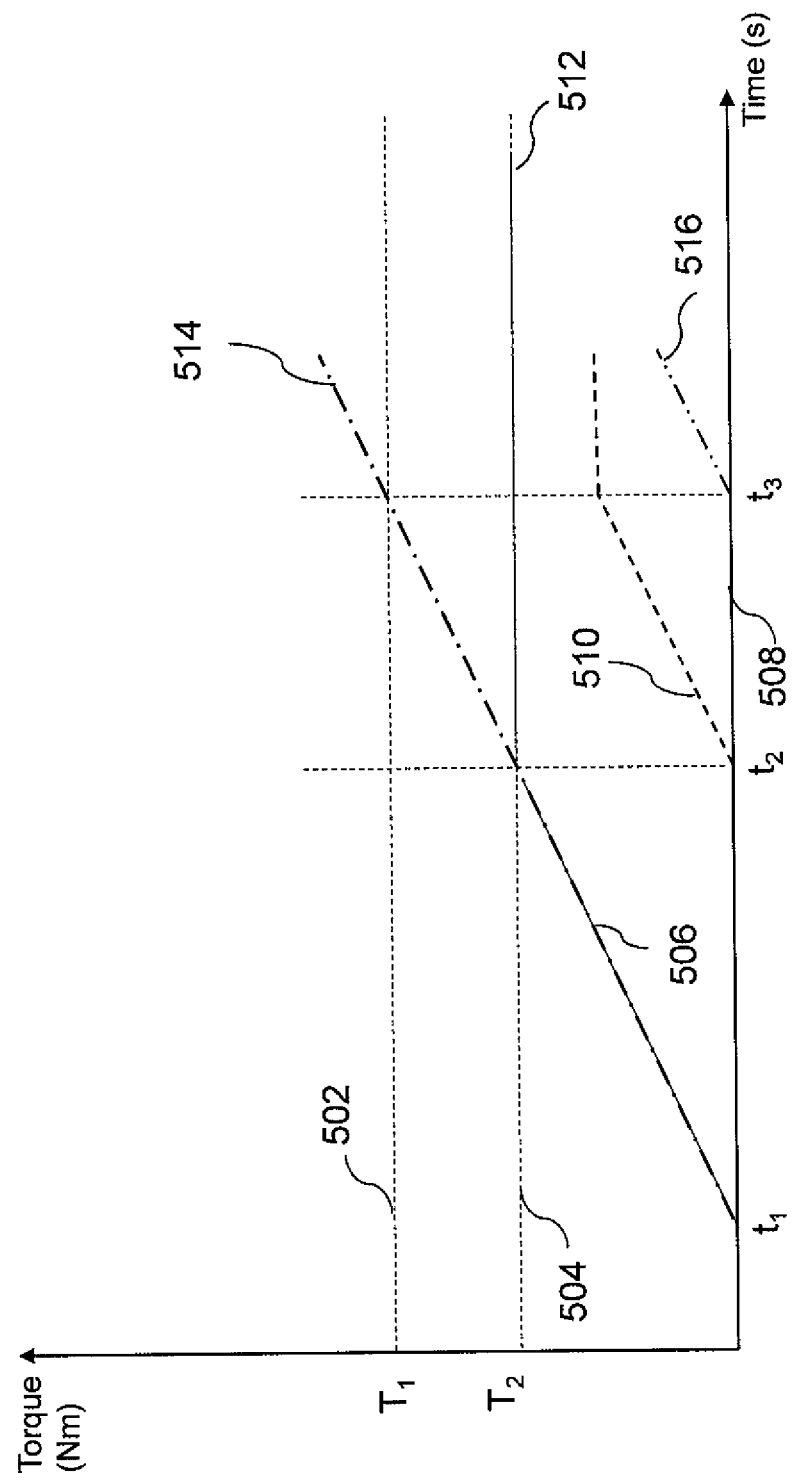
FIG. 5 shows a graph illustrating an exemplary regenerative braking sequence with constantly increased desired brake torque by the driver, and a limited regenerative brake torque provided by electrical machine.

The invention is further disclosed in another scenario, where a braking sequence with constantly increased brake torque 514 is requested by the driver. This scenario is illustrated by the graph in FIG. 5. The regenerative braking system is configured to provide increased braking torque of the front hydraulically actuated friction brakes 116 by means of the anti-lock braking system 114 for compensating a limited rear wheel braking torque initiated by said electronic control unit 106. The line 502 as shown in FIG. 5, shows the value of brake torque $T_1$ corresponding to maximal brake torque of the initial brake pedal motion gap, for example 0.15 g, and line 504 shows a limited maximal allowed rear wheel brake torque level $T_2$, for example 0.10 g, due to vehicle cornering or the like. The maximal allowed rear wheel brake torque 504 is thus during this specific period limited by the ECU for stability reasons. Line 506 shows the level of rear wheel brake torque as provided by electric machine 104 and/or the electrically actuated friction brakes 120, and a clear knick is provided at time $t_2$ when line 506 reaches the limited maximal allowed brake torque level 504. Line 514 depicts the graphically representation of the desired braking torque, starting at time $t_1$, and derived from the brake pedal position, as well as the total braking torque provided by combination of front and rear friction brakes 116, 120 and regenerative braking.

When the rear wheel brake torque provided by electric machine 104 and/or the electrically actuated friction brakes 120 is limited, for example to 0.10 g, due to unstable conditions such as detected slippery road ice, snow, water, etc., or vehicle cornering, the electric machine 104 and/or the electrically actuated friction brakes 120 are not able to provide desired level of brake torque because the brake pedal 108 is within the initial brake pedal motion gap preventing the hydraulically actuated friction brakes 116 at the front wheels 118 from being actuated by brake pedal 108. In such a situation, the regenerative braking system 100 provides compensating front wheel brake torque by means of the anti-lock braking system 114 to reach the desired level of braking torque. Line 510 shows the increases level of compensating front wheel brake torque provided by the hydraulically actuated friction brakes 116 at the front wheels 118 starting at time $t_2$, and line 512 shows the value of limited rear wheel brake torque provided to avoid any vehicle stability problems from time $t_2$ onwards, as long as the circumstances behind the limited rear wheel brake torque remains constant.

Line 516 represents the front wheel brake torque as provided by master brake cylinder 110, which is actuated by the brake pedal 108. This brake torque is thus only available above brake torque level $T_1$, which corresponds to a brake pedal position outside the initial brake pedal motion gap, and it adds on to the hydraulic brake torque provided by the anti-lock braking system 114. This scenario thus shows that the inventive system and method solves the problem of non-matching brake pedal position and vehicle brake torque, without emerging vehicle stability problems.

The invention is not limited to the specific flowchart and aspects presented, but include all variations within the scope of the present claims. The internal sequence of the steps for arriving at balanced total braking torque of the vehicle can of course be varied according to the demands of circumstances and scenarios of the working of vehicle. Accordingly, the drawings and the description thereto are to be regarded as illustrative in nature, and not restrictive.

What is claimed is:

1. A regenerative braking system for a hybrid electric vehicle comprising:
   a braking system comprising a brake pedal suitable for being operated by a driver, a hydraulically actuated friction brake at at least one front wheel, an anti-lock braking system hydraulically connected to said hydraulically actuated friction brake, and an electrically actuated friction brake at at least one rear wheel;
   an electric machine connected to said at least one rear wheel and capable of performing regenerative braking of said at least one rear wheel; and
   an electronic control unit that controls the stability of said hybrid electric vehicle,
   wherein said at least one rear wheel is free from hydraulically actuated friction brakes,
   wherein said regenerative braking system is configured to provide increased braking torque of said front hydraulically actuated friction brake by means of said anti-lock braking system for compensating a decreased or limited rear wheel braking torque initiated by said electronic control unit, wherein said decreased or limited rear wheel braking torque initiated by said electronic control unit is a response to a determined over-braked condition of said at least one rear wheel,
   wherein said brake pedal moves along a pedal motion path when depressed and is provided with an initial brake pedal motion gap at the beginning of the pedal motion path that starts with the pedal at an undepressed state, and wherein, when the brake pedal is initially depressed and begins to move away from the undepressed state and along the pedal motion path within the initial brake pedal motion gap, the motion of the brake pedal is independent from the motion of pistons of a hydraulic master cylinder assembly of the hydraulic braking system such that no vehicle braking torque is providable by said hydraulically actuated friction brake of said at least one front wheel and vehicle braking torque is provided by at least one of said electrical machine or the friction brake of said at least one rear wheel, wherein, when the brake pedal is within the initial brake pedal motion gap and no decreased or limited rear wheel braking torque is initiated by said electronic control unit in response to a determined over-braked condition of said at least one rear wheel, said regenerative braking system is further configured to provide compensating brake torque only by means of the electrically actuated friction brake at the rear wheel for compensating a loss of regenerative braking torque of the electric machine.

2. A system according to claim 1, wherein each front wheel is mechanically disconnected from said electrical machine, such that said electrical machine is limited to regenerative braking by means of said at least one rear wheel.

3. A system according to claim 1, wherein said initial brake pedal motion gap lies within the range of 3%-50% of the total available brake pedal motion.

4. A system according to claim 1, wherein said electric machine is an AC or DC electrical motor rotationally connected to said at least one rear wheel.

5. A system according to claim 1, wherein said antilock braking system comprises a hydraulic pump unit, and wherein said hydraulic pump unit may provide increased hydraulic pressure in said hydraulic brake system required to increase the braking torque of said front hydraulically actuated friction brake.

6. A system according to claim 1, wherein said over-braked condition of said at least one rear wheel is determined based on factors selected from vehicle yaw rate, road temperature sensor data, outside air temperature data, rain sensor data, increased rear wheel slip, road inclination data, vehicle roll rate, suspension displacement data, or combinations thereof.

7. A system according to claim 1, wherein said braking system comprises a hydraulic master cylinder assembly having at least one piston arranged to be actuated by said brake pedal, a caliper assembly and corresponding brake disc at said at least one front wheel, and hydraulic lines that fluidly interconnect said hydraulic master cylinder assembly with said anti-lock braking system, and said caliper assembly of said at least one front wheel with said anti-lock braking system, and wherein said anti-lock braking system during at least one mode thereof is configured to pass on hydraulic pressure from said hydraulic master cylinder assembly to said caliper assembly.

8. A system according to claim 1, wherein said initial brake pedal motion gap lies within the range of 5%-40% of the total available brake pedal motion.

9. A system according to claim 1, wherein said initial brake pedal motion gap lies within the range of 7%-40% of the total available brake pedal motion.

10. A method for controlling regenerative braking of a hybrid electric vehicle, wherein the method comprises the steps of:

providing said hybrid electric vehicle with:
- a braking system having a brake pedal suitable for being operated by a driver, wherein the brake pedal moves along a pedal motion path when depressed;
- a hydraulically actuated friction brake at at least one front wheel;
- an anti-lock braking system hydraulically connected to said hydraulically actuated friction brake;
- an electrically actuated friction brake and no hydraulically actuated friction brakes at at least one rear wheel; and
- an electric machine connected to said at least one rear wheel and capable of performing regenerative braking of said at least one rear wheel;

providing said brake pedal with an initial brake pedal motion gap at the beginning of the pedal motion path that starts with the pedal at an undepressed state, wherein, when the brake pedal is initially depressed and begins to move away from the undepressed state along the pedal motion path within the initial brake pedal motion gap, the motion of the brake pedal is independent from the motion of each piston of the hydraulic master cylinder assembly of the hydraulic braking system such that no brake pedal originated vehicle braking torque is providable by said hydraulically actuated friction brake of said at least one front wheel and vehicle braking torque is provided by at least one of said electrical machine or the friction brake of said at least one rear wheel;

providing increased braking torque of said front hydraulically actuated friction brake by means of said anti-lock braking system for compensating a decreased or limited rear wheel braking torque initiated by said electronic control unit; and providing compensating brake torque only by means of the electrically actuated friction brake at the rear wheel for compensating a loss of regenerative braking torque of the electric machine when no decreased or limited rear wheel braking torque is initiated by said electronic control unit in response to a determined over-braked condition of said at least one rear wheel and when the brake pedal is within the initial brake pedal motion gap.

11. A method according to claim 10, further comprising the step of pressurising the hydraulically actuated friction brake at at least one front wheel by means of the hydraulic master cylinder assembly upon depression of the brake pedal beyond said initial brake pedal motion gap.

* * * * *